(12) United States Patent
Huang

(10) Patent No.: US 8,169,777 B2
(45) Date of Patent: May 1, 2012

(54) MODULAR COMPUTER

(76) Inventor: Fu-Chih Huang, Miaoli County (TW)

( * ) Notice: Subject to any disclaimer, the term of this patent is extended or adjusted under 35 U.S.C. 154(b) by 0 days.

(21) Appl. No.: 12/656,576

(22) Filed: Feb. 4, 2010

(65) Prior Publication Data

US 2010/0321885 A1 Dec. 23, 2010

(30) Foreign Application Priority Data

Jun. 19, 2009 (TW) .............................. 98211106 U

(51) Int. Cl.
*H05K 5/00* (2006.01)
*H05K 7/00* (2006.01)
*A47B 96/00* (2006.01)
*A47B 81/00* (2006.01)
*A47B 47/00* (2006.01)

(52) U.S. Cl. ......... 361/679.02; 361/679.57; 361/679.58; 361/679.59; 248/223.31; 248/223.41; 312/223.1; 312/223.2; 312/257.1; 312/263; 312/264

(58) Field of Classification Search ............ 361/679.01–679.61; 248/27.1, 248/223.31, 223.41; 312/223.1, 223.2, 265.1–265.6
See application file for complete search history.

(56) References Cited

U.S. PATENT DOCUMENTS

| 5,106,225 | A | * | 4/1992 | Andre et al. ............... 403/408.1 |
| 5,227,957 | A | * | 7/1993 | Deters ....................... 361/679.32 |
| 5,909,357 | A | * | 6/1999 | Orr ........................... 361/679.46 |
| 6,166,910 | A | * | 12/2000 | Ronberg et al. ............... 361/724 |
| 6,894,217 | B2 | * | 5/2005 | Li .................................. 174/382 |

* cited by examiner

*Primary Examiner* — Jayprakash N Gandhi
*Assistant Examiner* — Jerry Wu
(74) *Attorney, Agent, or Firm* — Bacon & Thomas, PLLC

(57) ABSTRACT

A modular computer includes a main board unit, a power supply unit, a CPU, a graphic/display unit, a data reading/writing unit and a plurality of fasteners. Each of the units is formed into a rectangular six-face-boxed modular. A connector is provided on one of the faces of the units. The units are stacked in vertical direction or arranged in horizontal direction. The units are fixed together by the fasteners. The connectors provide electrical connection among the units.

12 Claims, 5 Drawing Sheets

MODULAR COMPUTER

FIELD OF THE INVENTION

The present invention generally relates to a computer assembly, and more particularly to a modular computer.

BACKGROUND OF THE INVENTION

A conventional computer generally includes a rectangular case, a large-area motherboard secured inside the case, a plurality of functional sub-boards set on the motherboard, and a power supply, hard disk drive as well as optical disk drive etc. secured inside the case.

However, the area or volume of the motherboard in the conventional computer is very large. Thus, the area or volume of the conventional computer is very large. Furthermore, the connectors for electrically connecting the components mentioned above are variously arranged according to the design of different manufacturers. Hence, it is difficult for users to assemble a computer with the components mentioned above. Moreover, when it is necessary to replace any component, such as the sub-boards or hard disk drive, inside the case, the procedures to disassemble and re-assemble the components are troublesome.

SUMMARY OF THE INVENTION

Accordingly, the present invention relates to a modular computer that is substantially intended to obviate one or more of the problems due to the limitations and disadvantages encountered in the prior art.

One object of the present invention is to provide a modular computer whose area or volume is small.

Another object of the present invention is to provide a modular computer which is easily assembled.

Additional features and advantages of the invention will be set forth in the description which follows, and in portion will be apparent from the description, or may be learned by practice of the invention. The objectives and advantages of the invention will be realized and attained by the structure as particularly set forth in the written description and claims as well as illustrated in the appended drawings.

To achieve these and other advantages and according to the purpose of the present invention, as embodied and broadly described, a modular computer comprises a plurality of units which includes a power supply unit, a main board unit, a graphic/display unit and a data reading/writing unit, each of the plurality of units being configured to be a multi-faced box and including a connector on one of faces of the box, the plurality of units being arranged in a direction and being fixed together by a plurality of fasteners, and the connectors respectively on the opposite faces of two of the plurality of units which are adjacent being electrically connected.

In a preferred aspect, the direction is a vertical direction.

Moreover, the direction is a horizontal direction.

It is another preferred feature that the modular computer further comprises a base plate which is adjacent to one of the plurality of units for supporting weight of the plurality of units.

Additionally, there exists a gap between the two adjacent units.

Furthermore, the modular computer further comprises a central processing unit which is adjacent to the main board unit.

It is preferred that the connectors include a first connector for transmitting signals and a second connector for transmitting power.

It is preferred that the connectors include a first connector for transmitting signals and a second connector for a bus.

It is preferred that the connectors further include a third connector, which is a socket to a power supply, a socket of a universal series bus (USB), or a socket for a video graphic array (VGA).

It is preferred that the plurality of units are formed with bores; each of the plurality of fasteners includes a nut portion, a threaded rod portion extending away from one side of the nut portion, a stem portion extending away from another side of the nut portion and a threaded hole formed in the stem portion; the stem portion passes through the bores; and the threaded rod portion in one of the plurality of fasteners is screwed to the threaded hole in another of the plurality of fasteners to fix the adjacent units together.

It is preferred that there exists a gap between the adjacent units and the nut portion is accommodated in the gap.

It is preferred that the plurality of units are formed with a concave on one of the faces and the nut portion is accommodated in the concave.

It is preferred that the connectors are engaged with each other to form electrical connection.

It is preferred that electrical connection of the connectors is made by a flat cable.

It is to be understood that both the foregoing general description and the following detailed description are exemplary and explanatory and are intended to provide a further non-limiting explanation of the invention as claimed.

BRIEF DESCRIPTION OF THE DRAWINGS

The accompanying drawings, which are included to provide a further understanding of the invention and constitute a portion of the specification, illustrate embodiments of the invention and together with the description serve to explain the principle of the invention. In the drawings.

DETAILED DESCRIPTION OF THE INVENTION

Figure 1:
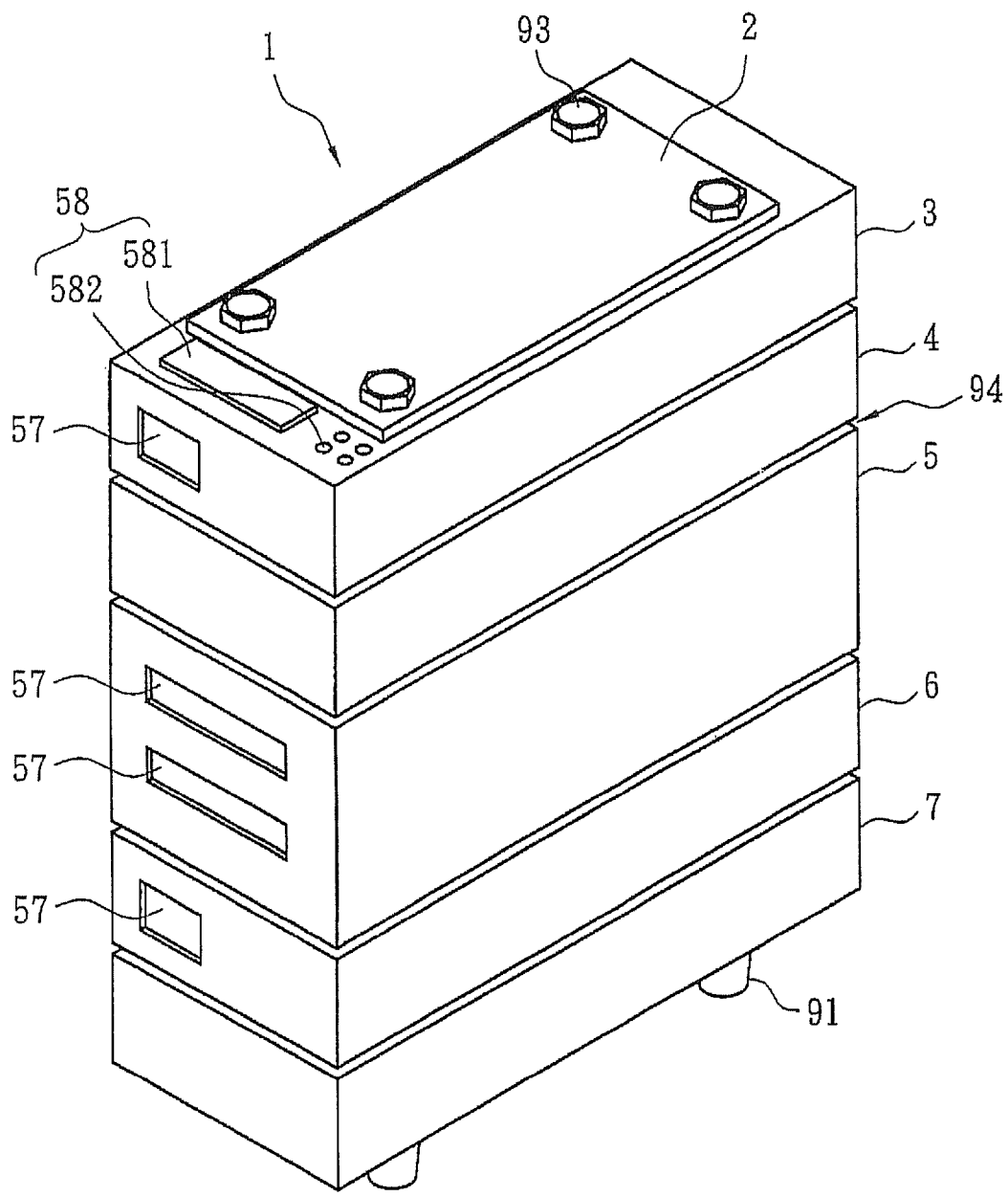
FIG. 1 is an assembled perspective view illustrating a modular computer according to the first preferred embodiment of this invention.
Figure 2:
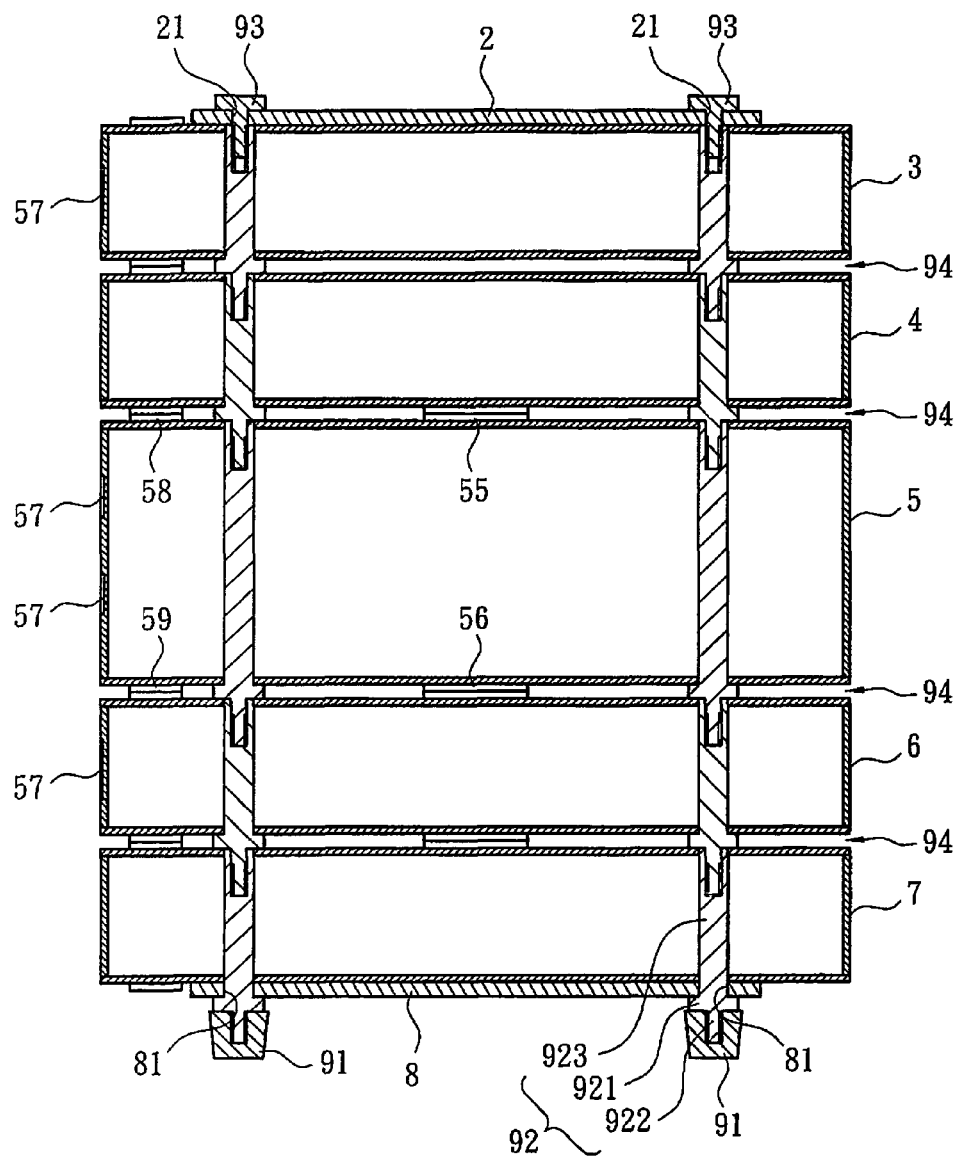
FIG. 2 is a sectional view of the modular computer in the FIG. 1.
Figure 3:
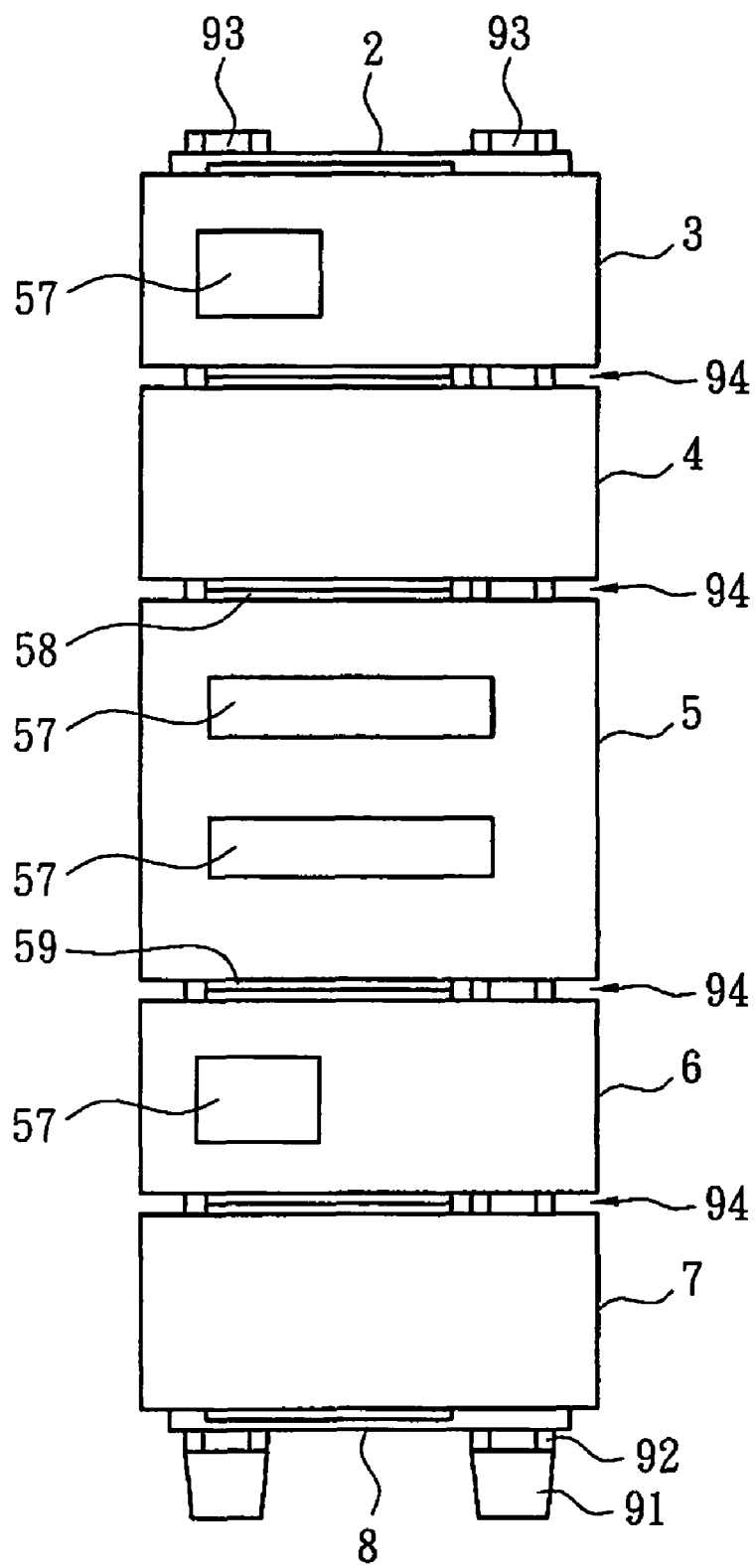
FIG. 3 a rear view of the modular computer in the FIG. 1.

As shown in FIGS. 1, 2 and 3, the modular computer 1 of the first preferred embodiment in this invention includes a plurality of units which are classified according to functions and attributes of the whole conventional computer. Each unit is manufactured into a module of a rectangular or cubic shape. The modules are stacked in vertical direction, i.e. one on another, and electrically connected by the connectors situated on the surfaces of the modules to become a rectangular modular computer.

The modular computer 1 of this invention includes, for example, a lid plate 2, a power supply unit 3, a central processing unit (CPU) 4, a main board unit 5, a graphic/display unit 6, a data reading/writing unit 7, a base plate 8, a plurality of fasteners 92 and a plurality of pedestals 91. The power supply unit 3 may be a variable voltage unit, uninterruptible power supply (UPS) or accumulator battery. The CPU 4 may be a simplex or multiplex computing unit. The main board unit 5 may includes various functional design and chip sets. Data reading/writing unit 7 may includes a optical disk drive, hard disk drive and floppy disk drive etc.

Figure 4:
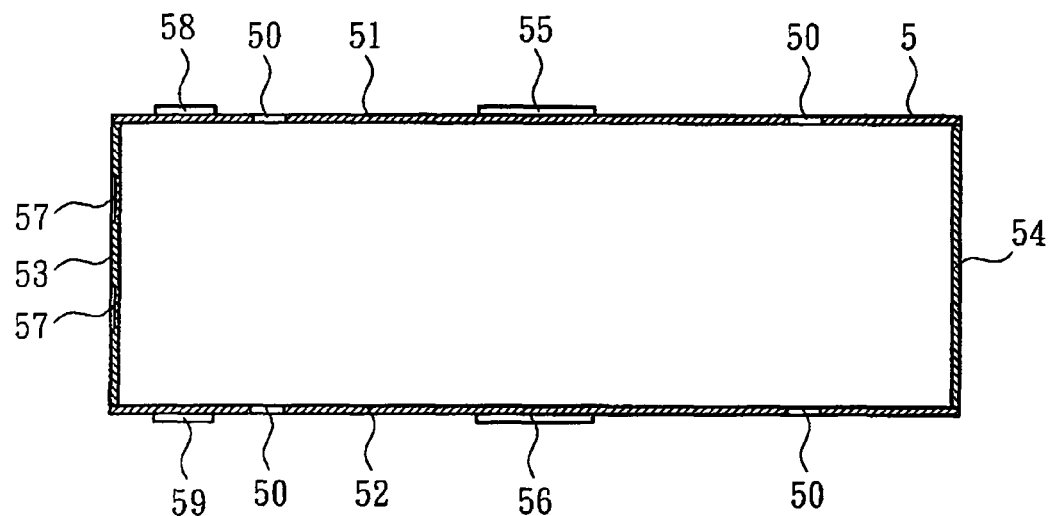
FIG. 4 a sectional view of the main board unit in the FIG. 1.
Figure 5:
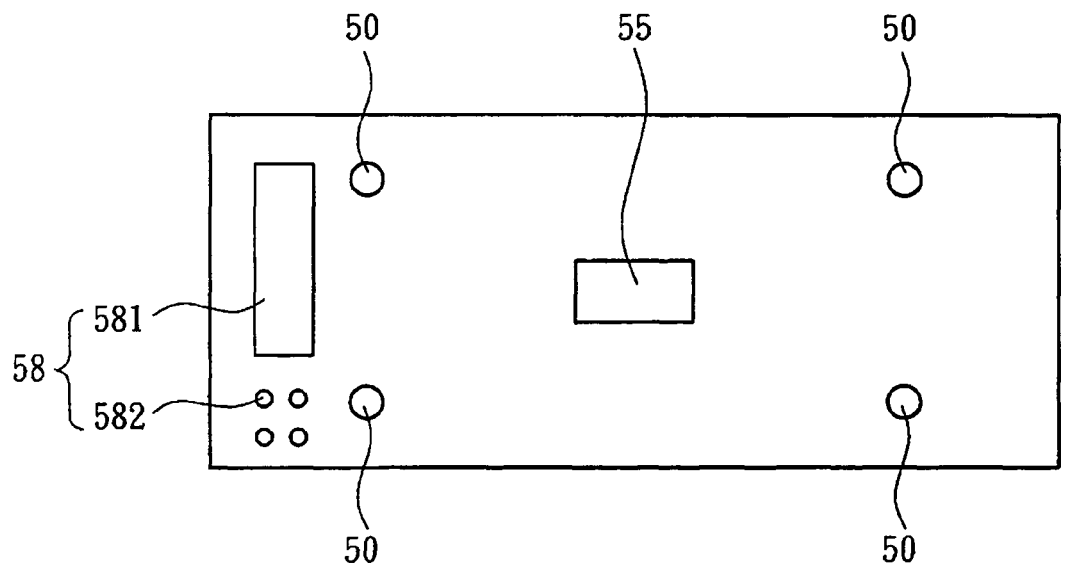
FIG. 5 a top or bottom plan view of the main board unit in the FIG. 1.

As shown in FIGS. 4 and 5, the main board unit 5 of this invention is obtained by dividing conventional motherboard into several portion, for example, according to functional categories. Each portion is arranged or mounted on one of six walls of a rectangular or oblong six-faced box. The embodiment shown in the FIG. 4 is a main board unit 5 with only four portions. The four portions are respectively arranged on the inner sides of the first wall 51, the second wall 52, the third wall 53 and the fourth wall 54 of the six-faced main board unit 5. The main board unit 5 further includes the first and fourth connectors 55, 58 installed on the first wall 51, the second and fifth connectors 56, 59 on the second wall 52, the third connector 57 on the third wall 53, a plurality of (for example four) bores 50 formed on the first and second walls 51, 52 and electronic elements (not shown) formed or mounted on inner sides of the walls 51, 52, 53, 54.

Alternatively, the electronic elements of the main board unit 5 can be arranged on six or some walls of the six-faced box. The walls of the main board unit 5 may be respectively manufactured and then electrically connected with connectors or flat cables. The circuit on the walls of the main board unit 5 may also be formed integrally.

The first connector 55 may be a plug or socket for transmitting signals, such as a socket for insertion of the CPU. The fourth connector 58 may include a socket 581 for peripheral component interconnect (PCI) bus, spherical or cylindrical pole 582 for electrical connection to the power supply, and reserved sockets (not shown). The second connector 56 may be a plug or socket for transmitting signals, such as a plug or socket for insertion of the graphic/display unit 6 or data reading/writing unit 7. The fifth connector 59 may include a plug or socket for peripheral component interconnect (PCI) bus, spherical or cylindrical pole for electrical connection to the power supply, and reserved plugs or sockets (not shown). The third connector 57 may include the socket of a universal series bus (USB). Alternatively, the fourth connector 58 and the first connector 55 may be combined and then referred to the first connector 55. The fifth connector 59 and the second connector 56 may be combined and then referred to the second connector 56.

If the bottom areas of the power supply unit 3, CPU 4, graphic/display unit 6 and data reading/writing unit 7 are larger than the bottom area of the main board unit 5 in this invention, each of the units 3, 4, 6, 7 may be divided into several portions according to the functions in similar way to the main board unit 5. Then, the several portions are respectively arranged or mounted on the walls of the six-faced units 3, 4, 6, 7. Each wall may be formed with openings for ventilation and heat dissipation.

The units 3, 4, 6, 7 may include, in a similar way to the main board unit 5, the first connector 55 and/or the fourth connector 58 provided on the top wall (corresponding to the first wall 51 in the main board unit 5), the second connector 56 and/or the fifth connector 59 provided on the bottom wall (corresponding to the second wall 52 in the main board unit 5), and/or the third connector 57 provided on the side wall (corresponding to the third wall 53 in the main board unit 5).

However, in other embodiments, the power supply unit 3 may includes only the third, fourth and fifth connectors 57, 58, 59 but without the first and second connectors 55, 56. The third connector 57 may be a socket to the power supply. The CPU 4 may include the second, fourth and fifth connectors 56, 58, 59 but without the first and third connectors 55, 57. The third connector 57 in the graphic/display unit 6 may be a socket for video graphic array (VGA) card. The data reading/writing unit 7 may include only the first, fourth and fifth connectors 55, 58, 59 but without the second and third connectors 56, 57.

Figure 6:
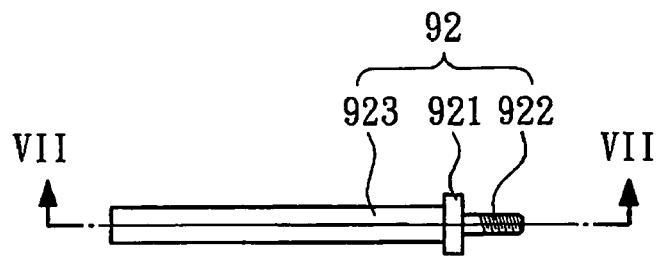
FIG. 6 is a front view of the fastener according to this invention.
Figure 7:
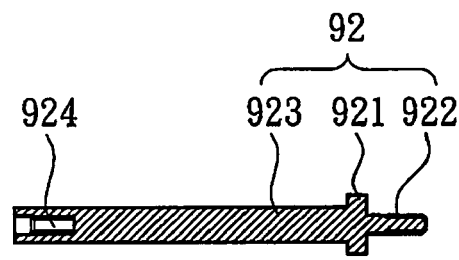
FIG. 7 is a sectional view taken along line VII-VII in the FIG. 6.

As shown in FIGS. 6 and 7, each of the fasteners 92 includes a nut portion 921, a threaded rod portion 922 extending away from one side face of the nut portion 921, a stem portion 923 extending away from another side face of the nut portion 921 and a threaded hole 924 formed within free end of the stem portion 923.

As shown in FIGS. 2 and 3, the lid plate 2 is formed with, for example, four orifices 21. The base plate 8 is formed with, for example, four perforations 81 correspondent to the four orifices 21. The base plate 8 and fasteners 92 may be made of material with high strength, such as metal, to support the weight of the modular computer.

Assembling

As shown in FIGS. 2, 4 and 7, the pedestals 91 are firstly screwed respectively to the threaded rod portions 922 of the first group of four fasteners 92. Next, the stem portion 923 of each fastener 92 passes through one of the perforations 81 in the base plate 8 and one of the bores 50 in the top and bottom walls of the data reading/writing unit 7. Because the length of the stem portion 923 is substantially equal to or a little bit smaller than the depth of the data reading/writing unit 7, the free end of the stem portion 923 is substantially flush with or lower than the upper surface of the top wall of the data reading/writing unit 7.

Subsequently, the threaded rod portions 922 of the second group of four fasteners 92 are respectively screwed to the threaded holes 924 of the first group of four fasteners 92. The data reading/writing unit 7 is fixed at this moment. Then, the stem portions 923 of the second group of fasteners 92 respectively pass through the bores 50 in the graphic/display unit 6. The graphic/display unit 6 is stacked on the data reading/writing unit 7. The second and fifth connectors 56, 59 situated on the bottom wall of the graphic/display unit 6 are respectively engaged with the first and fourth connectors 55, 58 situated on the top wall of the data reading/writing unit 7.

After that, the main board unit 5, CPU 4 and power supply unit 3 are orderly stacked on the graphic/display unit 6 with similar steps mentioned above. Finally, the lid plate 2 is placed on the top wall of the power supply unit 3. Four, for example, bolts 93 respectively pass through four orifices 21 and is then screwed to the threaded holes 924 of the last group of four fasteners 92.

After the modular computer 1 is completely assembled, the nut portion 921 of each fastener 92 is interposed between two adjacent units 3, 4, 5, 6, 7 so that there exists a gap 94 between the two units 3, 4, 5, 6, 7. The gap 94 may provides the function for ventilation or heat dissipation. The first, second, fourth and fifth connectors 55, 56, 58, 59 shown in the drawings respectively protrude from outer surface of the relative walls. This arrangement may facilitate one connector being engaged with correspondent connector to form electrical connection between two connectors. Alternatively, electrical connection between two connectors may be made by a flat cable.

Alternatively, the bottom wall of each unit 3, 4, 5, 6, 7 at an area facing the nut portion 921 may concave upwards to accommodate the nut portion 921. In such an embodiment, there is no gap 94 between two adjacent units 3, 4, 5, 6, 7 after the modular computer 1 is completely assembled. Besides, in this embodiment, the first, second, fourth and fifth connectors 55, 56, 58, 59 are respectively flush with relative walls in a situation similar to the third connector 57.

Alternatively, the number or types of the units may be increased or reduced depending on different models or user's requirement. For example, if a CPU is not built in the main board unit 5, it is necessary to assemble the CPU 4 with the main board unit 5. On the contrary, if a CPU has been built in the main board unit 5, the modular computer 1 may not include the CPU 4.

The modular computer 1 of this invention can be applied to personal computers, notebook computers, laptops or central controller computers for vehicles etc.

The Second Preferred Embodiment

Figure 8:
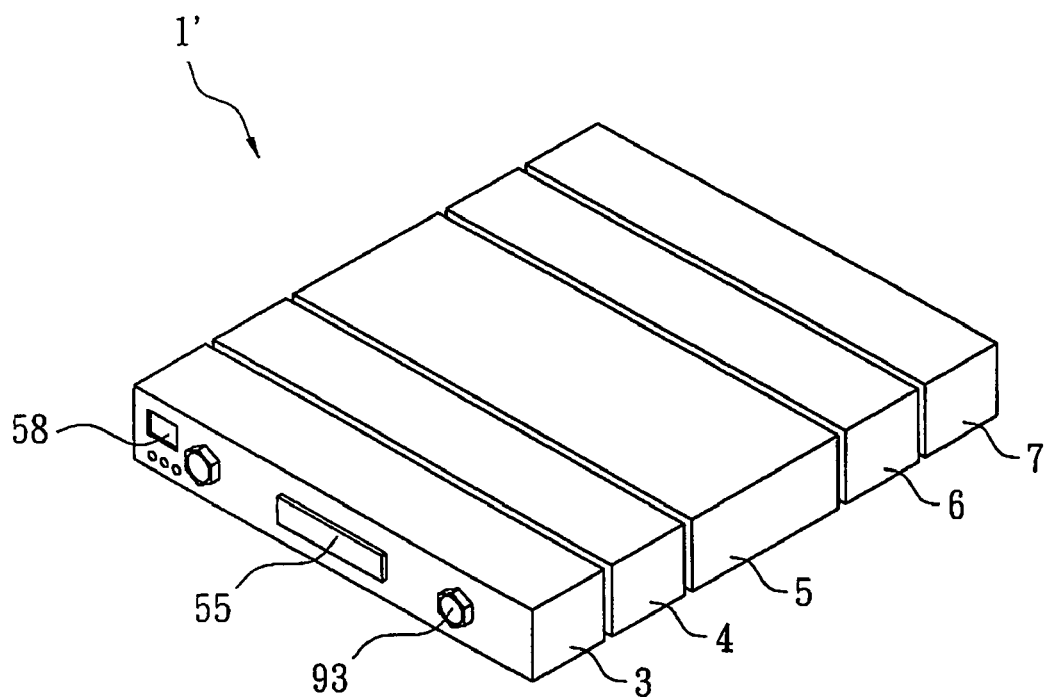
FIG. 8 is an assembled perspective view illustrating a modular computer according to the second preferred embodiment of this invention.

As shown in FIG. 8, the modular computer 1' of the second preferred embodiment of this invention is also classified according to functions and attributes of the whole conventional computer. Each unit is manufactured into a module of a rectangular or cubic shape. The modular computer 1' of this invention includes, for example, a power supply unit 3, a central processing unit (CPU) 4, a main board unit 5, a graphic/display unit 6, a data reading/writing unit 7. However, the units in the second preferred embodiment are juxtaposed in lateral or horizontal direction instead of the vertical direction in the first preferred embodiment. Beside, the lid plate 2 and base plate 8 are not necessary because the weight of all units is supported by user's table. Other characters of the second preferred embodiment are similar to those in the first preferred embodiment. Thus, the description of similar characteristics is omitted in the second embodiment.

This invention has been disclosed in terms of specific embodiments. It will be apparent that many modifications can be made to the disclosed structures without departing from the invention. Therefore, it is the intent of the appended claims to cover all such variations and modifications that are within the scope of this invention.

What is claimed is:

1. A modular computer comprising a plurality of units which includes a power supply unit, a main board unit, a graphic/display unit and a data reading/writing unit, each of the plurality of units being configured to be a multi-faced box and including a connector on one of the faces of the box, the plurality of units being arranged in a direction and being fixed together by a plurality of fasteners, and the connectors on opposing faces of a respective two of the plurality of units which are adjacent being electrically connected, wherein the plurality of units are formed with bores; each of the plurality of fasteners integrally includes a nut portion having a first outer diameter, a threaded rod portion extending away from one side of the nut portion, a stem portion having a second outer diameter smaller than the first outer diameter and extending away from another side of the nut portion, and a threaded hole formed in the stem portion; the stem portion passes through the bores such that the nut portion contacts one of the faces of the box which is passed through by the stem portion, to support a weight of the box; and the threaded rod portion in a first one of the plurality of fasteners is screwed to the threaded hole in a second one of the plurality of fasteners to fix the adjacent units together.

2. The modular computer as claimed in the claim 1, wherein the direction is a vertical direction.

3. The modular computer as claimed in the claim 1, wherein the direction is a horizontal direction.

4. The modular computer as claimed in the claim 1 further comprising a base plate which is adjacent to one of the plurality of units for supporting weight of the plurality of units.

5. The modular computer as claimed in the claim 1, wherein there exists a gap between the two adjacent units.

6. The modular computer as claimed in the claim 1 further comprising a central processing unit which is adjacent to the main board unit.

7. The modular computer as claimed in the claim 1, wherein the connectors include a first connector for transmitting signals and a second connector for transmitting power.

8. The modular computer as claimed in the claim 1, wherein the connectors include a first connector for transmitting signals and a second connector for a bus.

9. The modular computer as claimed in the claim 7 or 8, wherein the connectors further include a third connector, which is a socket to a power supply, a socket of a universal series bus (USB), or a socket for a video graphic array (VGA).

10. The modular computer as claimed in the claim 1, wherein there exists a gap between the adjacent units and the nut portion is accommodated in the gap.

11. The modular computer as claimed in the claim 1, wherein the plurality of units are formed with a concave on one of the faces and the nut portion is accommodated in the concave.

12. The modular computer as claimed in the claim 7 or 8, wherein the connectors are engaged with each other to form at least one electrical connection.

* * * * *